United States Patent
Kokko et al.

(10) Patent No.: US 8,965,653 B2
(45) Date of Patent: Feb. 24, 2015

(54) PARTIAL PREFILL OF CLUTCH FOR COAST DOWNSHIFT CONDITIONS IN A VEHICLE

(71) Applicant: GM Global Technology Operations LLC, Detroit, MI (US)

(72) Inventors: Kristopher J. Kokko, Novi, MI (US); Dara Monajemi, Lansing, MI (US); David C. Webert, Livonia, MI (US); Amanda P. Igel, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 13/949,295

(22) Filed: Jul. 24, 2013

(65) Prior Publication Data

US 2015/0032341 A1    Jan. 29, 2015

(51) Int. Cl.
*G06F 7/00* (2006.01)
*F16D 48/06* (2006.01)
*B60W 10/02* (2006.01)
*B60W 10/10* (2012.01)

(52) U.S. Cl.
CPC ............... *F16D 48/06* (2013.01); *B60W 10/02* (2013.01); *B60W 10/10* (2013.01)
USPC ............... 701/68; 477/44; 477/171; 477/180; 192/3.58; 192/48.601

(58) Field of Classification Search
CPC .......... B60W 10/02; B60W 2050/001; B60W 2050/004; B60W 2510/02; B60W 2510/0208; B60W 2510/0216; B60W 2510/0291; B60W 2510/1075; B60W 2510/108; B60W 2710/02; B60W 2710/021; B60W 2710/022; B60W 2710/029; B60W 2710/0655; B60W 2710/1077; B60W 2710/1083; B60W 2710/1072
See application file for complete search history.

(56) References Cited

U.S. PATENT DOCUMENTS

| | | | | |
|---|---|---|---|---|
| 6,428,440 | B2 * | 8/2002 | Yuasa et al. ................ | 475/125 |
| 6,514,166 | B2 * | 2/2003 | Yuasa et al. ................ | 475/125 |
| 8,510,005 | B1 * | 8/2013 | Monajemi et al. .......... | 701/67 |
| 2012/0191310 | A1 * | 7/2012 | Whitton et al. ............. | 701/68 |

* cited by examiner

*Primary Examiner* — David D Le
(74) *Attorney, Agent, or Firm* — Quinn Law Group, PLLC

(57) ABSTRACT

A vehicle transmission includes a plurality of oncoming clutches that are hydraulically-actuated. A controller is operatively connected to the plurality of oncoming clutches. An algorithm stored on and executable by the controller causes the controller to determine if at least one predefined coast condition is met and identify the plurality of oncoming clutches configured to be engageable during a downshift event from an initial gear ratio to respective other gear ratios. The initial gear ratio is greater than each of the respective other gear ratios. The algorithm causes the controller to generate a first pressure command to at least partially pressurize a first one of the oncoming clutches to a first staging pressure $(P_{S1})$ if the at least one predefined coast condition is met prior to the downshift event. The first staging pressure $(PS_1)$ is defined as a first return spring pressure $(P_{R1})$ minus a first variable correction factor $(CF_1)$.

20 Claims, 3 Drawing Sheets

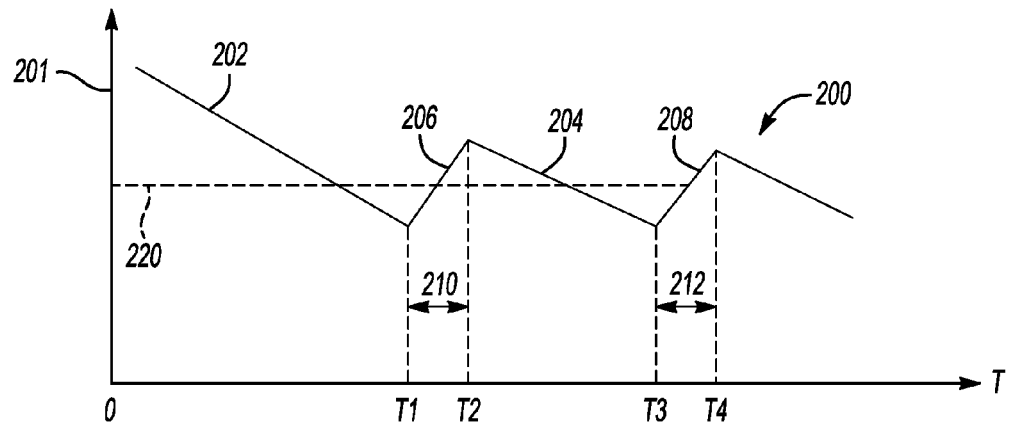
Fig-3
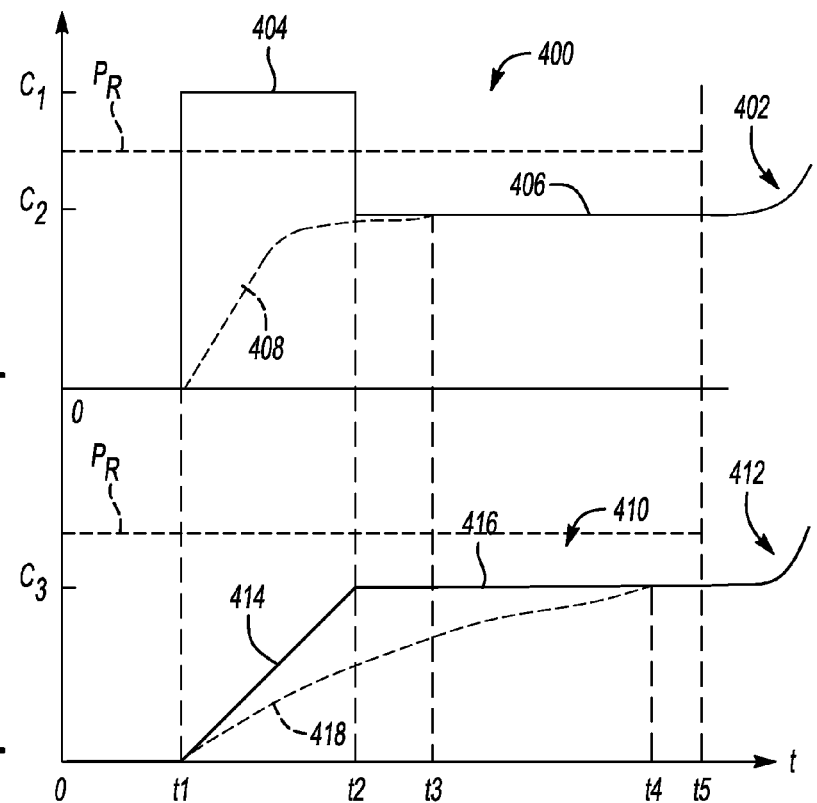
Fig-5A
Fig-5B

PARTIAL PREFILL OF CLUTCH FOR COAST DOWNSHIFT CONDITIONS IN A VEHICLE

TECHNICAL FIELD

The disclosure relates generally to a transmission in a vehicle and a method of controlling a transmission, and more specifically, to at least partially prefilling clutches during coast downshift conditions prior to the coast downshift event.

BACKGROUND

Vehicle transmissions generally include one or more clutches for performing various functions. A clutch generally uses friction to rotatably couple two different elements, for example, rotatably coupling an input shaft to an output shaft. The clutches in the vehicle are engaged in accordance with vehicle speed and engine load conditions so that the transmission is upshifted to successively lower numerical gear ratios as the speed of the vehicle is increased, and downshifted to successively higher numerical gear ratios as the speed of the vehicle is decreased.

SUMMARY

A transmission in a vehicle includes a plurality of oncoming clutches that are hydraulically-actuated ("plurality of" is omitted henceforth). A controller is operatively connected to the plurality of oncoming clutches. An algorithm stored on and executable by the controller causes the controller to determine if at least one predefined coast condition is met and identify the oncoming clutches configured to be engageable during a downshift event from an initial gear ratio to respective other gear ratios. The initial gear ratio is greater than each of the respective other gear ratios.

The algorithm causes the controller to at least partially prefill a first one of the plurality of oncoming clutches by generating a first pressure command to at least partially pressurize the first one of the oncoming clutches to a first staging pressure ($P_{S1}$) if the predefined coast condition is met prior to the (coast) downshift event. The first staging pressure ($PS_1$) is defined as a first return spring pressure ($P_{R1}$) minus a first variable correction factor ($CF_1$).

The controller is programmed with a first look-up table defining the first variable correction factor ($CF_1$) for the first one of the oncoming clutches. The first one of the oncoming clutches includes a first biasing member characterized by the first return spring pressure ($P_{R1}$) such that the first one of the oncoming clutches is fully engaged when the first return spring pressure ($P_{R1}$) is applied.

In one embodiment, the transmission defines first, second, third, fourth, fifth and sixth gear ratios. The initial gear ratio may correspond to the sixth gear ratio and the respective other gear ratios include the fifth, fourth and third gear ratios. The controller may be configured to cancel the pressure command if the coast condition is exited. The pressure command may be sequentially turned on and off for respective calibrated on and off-times. In one non-limiting example, the respective calibrated on and off-times are each 30 seconds.

The algorithm stored on and executable by the controller may further cause the controller to generate a second pressure command to at least partially pressurize a second one of the oncoming clutches to a second staging pressure ($P_{S2}$) if the at least one predefined coast condition is met prior to the coast downshift.

The algorithm stored on and executable by the controller may further cause the controller to generate respective pressure commands to at least partially pressurize each of the oncoming clutches to respective staging pressures ($P_S$) if the at least one predefined coast condition is met. The respective staging pressures ($P_S$) are defined as the respective return spring pressures ($P_R$) minus the respective variable correction factors (CF).

The vehicle includes a torque converter operatively connected to the transmission and having a turbine defining a turbine speed. The first look-up table may be based at least partially on the turbine speed and a transmission fluid temperature.

The vehicle includes an engine operatively connected to the transmission and producing an engine torque. The predefined coast condition may be met when the engine torque is below a predefined maximum engine torque. In one non-limiting example, the predefined maximum engine torque is approximately 15 Nm. The vehicle includes an accelerator pedal operatively connected to the transmission and defining a pedal position. The predefined coast condition may be met when the pedal position of the accelerator pedal is less than a predefined calibrated pedal position.

A method of controlling a transmission is provided. The method includes: determining whether at least one predefined coast condition is met and identifying the oncoming clutches configured to be engageable during a downshift event from an initial gear ratio to respective other gear ratios. A staging pressure ($P_S$) is determined for the oncoming clutches. A pressure command is generated to at least partially pressurize at least one of the oncoming clutches to the staging pressure ($P_S$) if the at least one predefined coast condition is met prior to the downshift event.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a graph of successive downshift events as the vehicle speed is decreasing;

FIG. 5A illustrates a first example of a pressure command that may be employed to engage the clutches of FIG. 1, where the horizontal axis represents time; and FIG. 5B illustrates a second example of a pressure command that may be employed to engage the clutches of FIG. 1, where the horizontal axis represents time.

DETAILED DESCRIPTION

Figure 1:
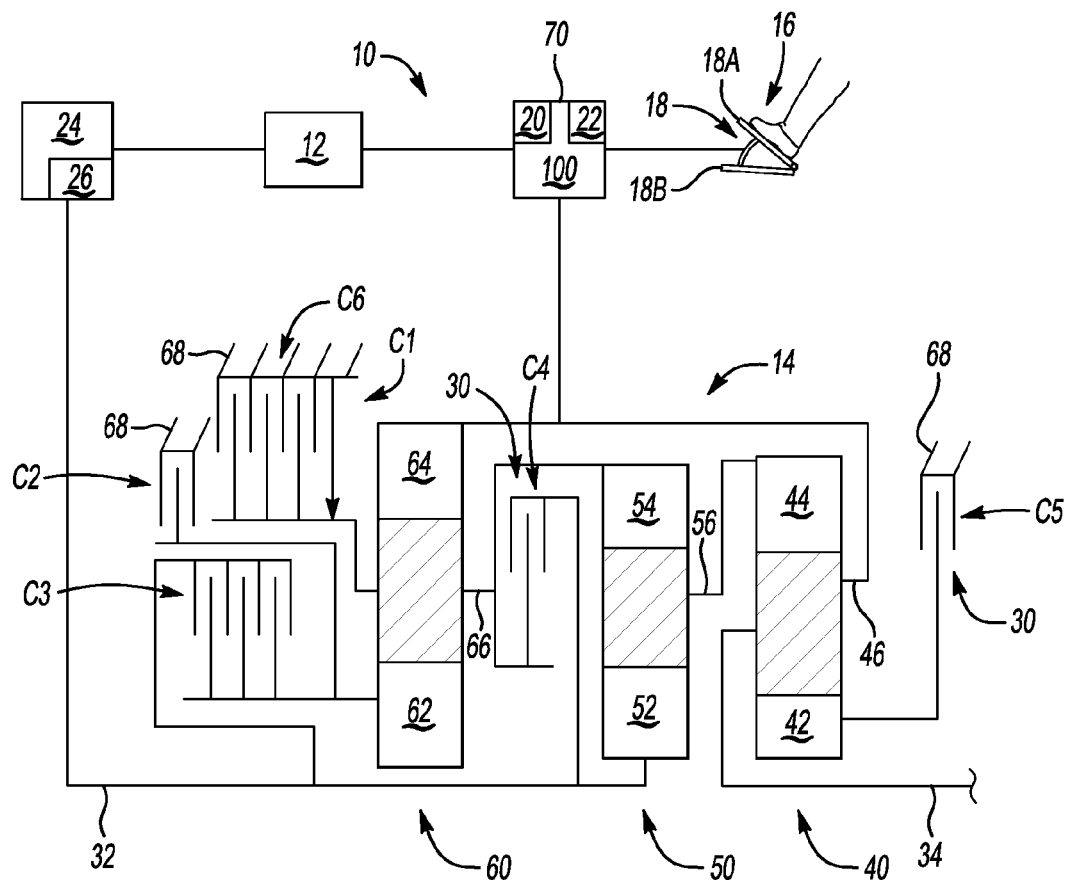
FIG. 1 is a schematic illustration of a vehicle having an engine, a controller and a transmission having a plurality of clutches.

Referring to the drawings, wherein like reference numbers refer to like components, FIG. 1 is a schematic illustration of a vehicle 10 having an engine 12, a transmission 14 and a controller 70. The vehicle 10 may be any passenger or commercial automobile such as a hybrid electric vehicle including a plug-in hybrid electric vehicle, an extended range electric vehicle, or other vehicles. The vehicle may take many different forms and include multiple and/or alternate components and facilities. While an example vehicle is shown in the Figures, the components illustrated in the Figures are not intended to be limiting. Indeed, additional or alternative components and/or implementations may be used. The controller 70 may be an integral portion of or a separate module operatively connected to the transmission control module (TCM) and/or the engine control module (ECM) of the vehicle 10.

Referring to FIG. 1, the engine 12 produces an engine torque. The engine 12 may include any device configured to generate the engine torque by, for example, converting a fuel into rotational motion. Accordingly, the engine 12 may be an internal combustion engine configured to convert energy from a fossil fuel into rotational motion using a thermodynamic cycle.

The engine 12 is responsive to an operator torque request requesting a relative level of engine torque. Referring to FIG. 1, the torque request may be communicated from an accelerator pedal 16 to the controller 70 through a user interface (not shown). The torque request may be in the form of an apply force to or a corresponding percentage of travel of the accelerator pedal 16, as indicated by a pedal position 18. The accelerator pedal 16 is movable between a minimum pedal position 18A and a maximum pedal position 18B. The pedal position 18 may be detected via a force or position sensor (not shown) in a conventional manner known to those skilled in the art. In response to receipt of the torque request by the controller 70, the engine 12 generates engine torque, which is delivered as an input torque to the transmission 14.

Referring to FIG. 1, a torque converter 24 is operatively connected to the engine 12 and transmission 14. As is known to those skilled in the art, the torque converter 24 includes a turbine 26 that spins due to the motion of transmission fluid. The turbine 26 defines a turbine speed $S_T$. The torque converter 24 may include other components not shown, such as a stator and an impeller.

Referring to FIG. 1, the transmission 14 includes a plurality of clutches 30 that are selectively engageable in different combinations to establish multiple forward gear ratios and a reverse gear ratio between an input member 32 and an output member 34 of the transmission 12. The input member 32 receives input torque from the engine 12, and the output member 34 provides the torque through a final drive to vehicle wheels (not shown), as is understood by those skilled in the art. Referring to FIG. 1 and as described later, the controller 70 includes an on-timer 20 and an off-timer 22 to control engagement of the clutches 30.

In the embodiment shown in FIG. 1, the transmission 14 includes clutches C1, C2, C3, C4, C5 and C6. The clutch engagement schedule to establish the multiple gear ratios is shown in Table 1. An "X" indicates that a clutch 30 is engaged and carrying torque. A "G" indicates that a clutch 30 is engaged and carrying torque in a garage shift. A "C" indicates that a clutch 30 is engaged and carrying torque for purposes of manual range coasting. Any suitable transmission known to those skilled in the art may be employed in the vehicle 10. It is to be understood that the transmission 12 shown in FIG. 1 is provided as a non-limiting example.

TABLE 1

| Gear State | Gear Ratio | Ratio Step | C1 | C2 | C3 | C4 | C5 | C6 |
|---|---|---|---|---|---|---|---|---|
| Rev | −2.94 | | | | G | | | X |
| Neutral | | −0.642 | | | | | | |
| 1st | 4.710 | | X | | | | G | C |
| 2nd | 3.317 | 1.42 | X | X | | | | X |
| 3rd | 2.306 | 1.44 | X | | X | | | X |
| 4th | 1.964 | 1.17 | X | | | X | X | |
| 5th | 1.493 | 1.32 | X | | | | X | X |
| 6th | 1.296 | 1.15 | | | X | | X | X |

Referring to FIG. 1, the transmission 14 includes a gearing arrangement of three planetary gear sets 40, 50 and 60. Each planetary gear set 40, 50 and 60 has a respective sun gear member 42, 52, 62, ring gear member 44, 54, 64 and carrier member 46, 56, 66 that supports pinion gears that mesh with both the sun gear member 42, 52, 62 and the ring gear member 44, 54, 64.

Referring to FIG. 1, the clutch C1 is a one-way clutch engageable to connect the carrier member 66 to a stationary (nonrotating) member 68, such as the transmission casing. The clutch C2 is engageable to connect the sun gear member 62 to the stationary member 68. The clutch C3 is engageable to connect the input member 32 to sun gear member 62. The clutch C4 is engageable to connect the carrier member 66 to the input member 32 and sun gear member 52. The clutch C5 is engageable to connect the sun gear member 42 to the stationary member 68. The clutch C6 is engageable to connect to connect the carrier member 66 to the stationary member 68. The input member 32 is continuously interconnected with sun gear member 52. The clutches C1-C6 are operatively connected to the controller 70.

The clutches 30 may be hydraulically operated, with exception to the one-way clutch C1. That is, clutch 30 may be configured to engage when provided with fluid at a minimum pressure and disengage when provided with fluid below the minimum pressure. Each clutch 30 may include any device configured to engage to transfer torque generated by one component of the vehicle 10 to another. For instance, each clutch 30 may include a driving mechanism and a driven mechanism. The driving mechanism may be configured to rotate when provided with a rotational force. When fully engaged, the driven mechanism may rotate at the same speed as the driving mechanism. When disengaged or partially engaged, however, the driven mechanism is free to slip relative to the driving mechanism, allowing the driving mechanism and the driven mechanism to rotate at different speeds.

Figure 2:
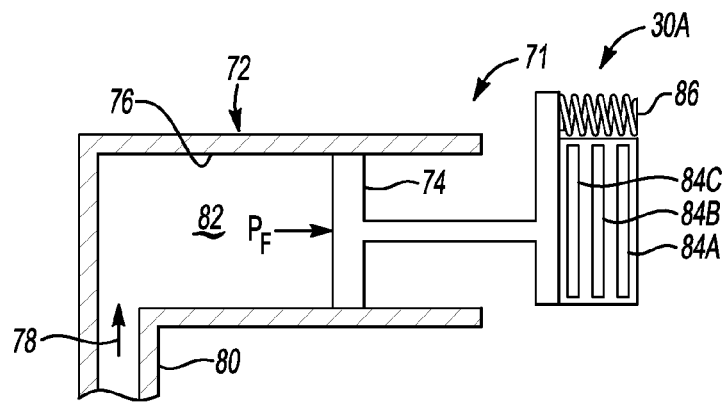
FIG. 2 is a schematic illustration of an example clutch that may be employed in the transmission of FIG. 1.

Referring to Table 1, the transmission 14 defines a plurality of gear ratios or speed ratios. Shifting between gear ratios involves, in most cases, disengaging a clutch (known as an off-going clutch) associated with the initial gear ratio and engaging another clutch (known as an oncoming clutch) associated with the other gear ratio. FIG. 2 schematically illustrates an example assembly 71 for an oncoming clutch 30A. The assembly 71 (not drawn to scale) may take many different forms and include multiple and/or alternate components and facilities. It is to be understood that the example illustrated in FIG. 2 is not intended to be limiting.

Referring to FIG. 2, the assembly 71 includes a cylinder 72 having a piston 74 positioned within a chamber 76. When a pressure command is generated by the controller 70, pressurized hydraulic fluid 78 enters the chamber 76 through a hydraulic line 80 and fills a predefined fill volume 82. The predefined fill volume 82 may include the volume of the chamber 76 as well as a portion of the hydraulic line 80. The fluid 78 exerts a fluid pressure $P_F$ on the piston 74, thereby articulating the clutch 30A through various states. The hydraulic line 80 may be fluidly connected to a fluid pump (not shown).

Referring to FIG. 2, the oncoming clutch 30A includes a plurality of plates 84A, B, C. When the clutch 30A is not actuated, the plates 84A-C are kept separate with the use of the biasing member 86 operatively connected to the plates 84A-C. The biasing member 86 is characterized by a critical pressure, referred to herein as "return spring pressure $P_R$." When the fluid pressure $P_F$ on the piston 74 reaches or exceeds the return spring pressure $P_R$, the plates 84A-C are brought into contact with each other, and frictional forces between the plates 84A-C create a locked relationship where the plates 84A-C move in unison if fluid pressure $P_F$ is high enough. The oncoming clutch 30A is fully engaged when the return spring pressure $P_R$ is applied to the biasing member 86. The oncoming clutch 30 may include any number of plates, other components not shown and other configurations known to those skilled in the art. The assembly 71 may include pump regulators and other components not shown.

Referring to FIG. 1, the clutches 30 are engaged in accordance with vehicle speed and engine load conditions so that the transmission 14 is upshifted to successively lower numerical gear ratios as the speed of the vehicle 10 is increased, and downshifted to successively higher numerical gear ratios as the speed of the vehicle 10 is decreased. FIG. 3 illustrates a graph 200 of successive downshift events where the speed of the vehicle 10 is decreasing. The vertical axis 201 represents the turbine speed $S_T$ of the turbine 26 (of FIG. 1) and the horizontal axis T represents time. Graph portions 202, 204 represent the turbine speed $S_T$ at the 6th and 5th gear ratios, respectively. Graph portions 206, 208 represent downshift events from the 6th to the 5th gear and from the 5th to the 4th gear, respectively.

Referring to FIGS. 1, 3 and Table 1, the 6th and 5th gear downshift in the transmission 14 is effected by executing a controlled release of clutch C2 initiating at time T1 and completing by time T2 and applying clutch C3 in a controlled way initiating at time T1 and completing at time T2. Referring again to Table 1, the 5th to 4th gear downshift is effected by executing a controlled release of clutch C3 initiating at time T3 and completing by time T4 and applying clutch C5 in a controlled way initiating at time T3 and completing at time T4. Referring to FIG. 3, conventionally, in the ratio change intervals 210, 212, the respective on-coming clutches are initially filled and then pressure ramps up by a commanded profile as commanded by controller 70. At the end of the ratio change intervals 210, 212, the oncoming clutch is carrying torque and the offgoing clutch is not carrying any torque.

Referring to FIGS. 1-3, the controller 70 is configured to at least partially pressurize one or more oncoming clutches 30A before the ratio change intervals 210, 212 of FIG. 3 (that is, prior to time T1 for the $6^{th}$ to $5^{th}$ gear downshift and prior to time T3 for the 5th to 4th gear downshift). Controller 70 does so by executing a stored algorithm 100. Controller 70 includes a processor that carries out the algorithm 100 which resides within the controller 70 or is otherwise readily executable by the controller 70. The controller 70 is configured to at least partially pressurize one or more oncoming clutches 30A to a staging pressure $P_S$ prior to a downshift event when at least one predefined coast condition is met. This allows for a faster downshift event and less demand on the fluid pump/hydraulic line 80 (see FIG. 2) at the time of the downshift event.

Figure 4:
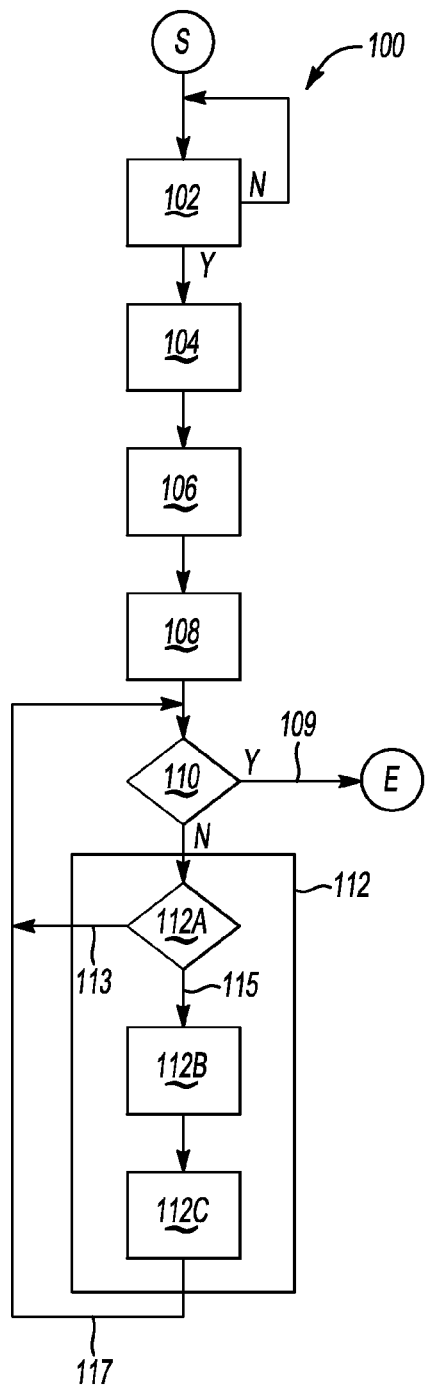
FIG. 4 is a flowchart of an algorithm stored on and executable by the controller of FIG. 1.

Algorithm 100 is described with reference to FIG. 4. Algorithm 100 need not be applied in the specific order recited herein. Furthermore, it is to be understood that some steps may be eliminated. Referring to FIG. 4, algorithm 100 may begin with step 102 where the controller 70 identifies whether at least one predefined coast condition is met. The predefined coast condition may be met when the engine torque is below a predefined maximum engine torque. In one non-limiting example, the predefined maximum engine torque is approximately 15 Nm.

Referring to FIG. 1, the predefined coast condition may be met when the pedal position 18 of the accelerator pedal 16 is less than a predefined calibrated pedal position. In one example, the predefined calibrated pedal position corresponds to approximately 10% of the maximum pressure being applied to the accelerator pedal 16, where the maximum pedal position 18B (see FIG. 1) corresponds to 100% of the maximum pressure being applied to the accelerator pedal 16 and the minimum pedal position 18A (see FIG. 1) corresponds to 0% pressure being applied on the accelerator pedal 16. If at least one coast condition is met, the algorithm 100 proceeds to step 104. If none of the coast conditions are met, the algorithm 100 loops back to step 102.

In step 104 of FIG. 4, the controller 70 identifies a plurality of oncoming clutches 30A configured to be engageable during a downshift event from an initial gear ratio to respective other gear ratios, the initial gear ratio being greater than each of the respective other gear ratios. For example if the initial gear ratio is the $7^{th}$ gear state, the identified clutches may include the respective oncoming clutches for the $7^{th}$ to $6^{th}$ gear downshift, $7^{th}$ to $5^{th}$ gear downshift, $7^{th}$ to $4^{th}$ gear downshift and the $7^{th}$ to $3^{rd}$ gear downshift.

In step 106 of FIG. 4, the controller 70 determines a staging pressure $P_S$ for the oncoming clutches 30A identified in step 104. For each oncoming clutch 30A, the staging pressure ($P_S$) is defined as the respective return spring pressure $P_R$ minus a respective variable correction factor (CF).

Staging Pressure ($P_S$)=Return Spring Pressure ($P_R$)− Variable Correction Factor (CF).

The controller 70 obtains the variable correction factor from respective look-up tables for each of the oncoming clutches 30A. The controller 70 may be programmed with a separate look-up table defining the variable correction factor for each oncoming clutch 30A. The look-up table may be based on turbine speed $S_T$ and transmission fluid temperature. Table 2 below indicates one example of a look-up table of correction factors at varying values of turbine speed $S_T$ (shown in the top-most row) and various temperatures of the transmission fluid (shown in the left-most column). This example is not intended to be limiting and any type of look-up table may be employed.

TABLE 2

|  | 4000 rpm or more | 3000 rpm | 2000 rpm | 1000 rpm or less |
| --- | --- | --- | --- | --- |
| −40° C. | 4000 | 4000 | 80 | 40 |
| 0° C. | 4000 | 4000 | 100 | 30 |
| 40° C. | 4000 | 4000 | 120 | 30 |
| 80° C. or more | 4000 | 4000 | 130 | 30 |

The look-up table may be populated based on the characteristics of the particular engine 12 and transmission 14. Referring to FIG. 3, the downshift event in a vehicle 10 may not occur until the turbine speed $S_T$ begins to approach an optimal downshift turbine speed 220. In one example, the optimal downshift turbine speed 220 is approximately 1000 rpm. Staging or partially pressurizing the oncoming clutch 30A may not be of utility when the current turbine speed $S_T$ is substantially away from the optimal downshift turbine speed 220. For efficiency, the look-up table is populated with arbitrarily high numbers (e.g. 4000) to turn staging off for turbine speeds $S_T$ such as 3000 rpm and above. As shown in Table 2, the correction factor gradually decreases as the turbine speed $S_T$ approaches 1000 rpm and the temperature of the transmission fluid is above a minimum temperature. In one example, the minimum temperature is approximately 0° C.

Temperature and turbine speed $S_T$ values that are in-between the values listed (shown in the top-most row and left-most column) in the look-up table may be determined by any interpolation technique known to those skilled in the art. For example, the correction factor at a temperature of 20° C. and turbine speed of 2000 pm may be determined by general interpolation techniques to be 110. For example, the correction factor at a temperature of 55° C. and turbine speed of 1700 pm may be determined by double interpolation techniques to be 95.6. Temperature and turbine speed $S_T$ values that are beyond the look-up table boundaries may be capped by the boundary values.

Table 3 below shows the staging pressure $P_S$ obtained with the look-up table of Table 2 for a return spring pressure $P_R$ of 150 kPa. As shown in Table 3, the staging pressure $P_S$ is less than the return spring pressure $P_R$ to avoid fully engaging the oncoming clutch 30A prior to the downshift event.

TABLE 3

|  | 4000 rpm or more | 3000 rpm | 2000 rpm | 1000 rpm or less |
|---|---|---|---|---|
| T = −40° C. | Less than 0 | Less than 0 | 70 kPa | 110 kPa |
| T = 0° C. | Less than 0 | Less than 0 | 50 kPa | 120 kPa |
| T = 40° C. | Less than 0 | Less than 0 | 30 kPa | 120 kPa |
| T = 80° C. or more | Less than 0 | Less than 0 | 20 kPa | 120 kPa |

In step 108 of FIG. 4, the controller 70 generates a pressure command to at least partially pressurize at least one of the oncoming clutches 30A identified in step 104 to the staging pressure $P_S$. The pressure command causes the predefined fill volume in the oncoming clutch 30A to be filled with a quantity of fluid such that the fluid exerts the staging pressure ($P_S$).

In one embodiment, the controller 70 generates a first pressure command to at least partially pressurize a first one of the oncoming clutches 30A (such as clutch C3 in Table 1 for the $6^{th}$ to $5^{th}$ gear downshift where the $6^{th}$ gear is the initial gear ratio) to a first staging pressure ($P_{S1}$). The controller 70 may generate a second pressure command to at least partially pressurize a second one of the oncoming clutches 30A (such as clutch C5 in Table 1 for the $6^{th}$ to $4^{th}$ gear downshift where the $6^{th}$ gear is the initial gear ratio) to a second staging pressure ($P_{S2}$).

In another embodiment, the controller 70 generates a respective pressure command to at least partially pressurize each of the oncoming clutches 30A identified in step 104 to their respective staging pressure ($P_S$). Thus, if n oncoming clutches 30A are identified in step 104, the controller 70 may generate a pressure command for 1 to n of the clutches or any number in between. Each of the oncoming clutches 30A includes a respective biasing member 86 characterized by a respective return spring pressure ($P_R$) such that the oncoming clutch 30A is fully engaged when the respective return spring pressure ($P_R$) is applied to the respective biasing member 86.

In step 110 of FIG. 4, the controller 70 is configured to cancel the pressure command if one or more exit conditions are met and exit the algorithm 100 (as indicated by line 109 and the letter "E"). The exit condition may be met if any of the predefined coast conditions are no longer met or the downshift event occurs. For example, the exit condition may be met if the engine torque goes above the predefined maximum engine torque or the pedal position 18 of the vehicle 10 (see FIG. 1) is beyond the predefined calibrated pedal position. If none of the exit conditions are met (as indicated by line 111) the algorithm proceeds to step 112.

In step 112 of FIG. 4, the controller 70 is configured to sequentially keep on and turn off the pressure command for a calibrated on-time and a calibrated off-time, respectively. In the embodiment shown, step 112 involves sub-steps 112A, 112B, 112C. In sub-step 112A of FIG. 4, the controller 70 determines if the staging pressure $P_S$ (as determined in step 106) is greater than zero. If the staging pressure $P_S$ is less than zero, the algorithm 100 returns to step 110, as shown by line 113. In other words, the oncoming clutch 30A is not staged if the staging pressure $P_S$ is less than zero. If the staging pressure $P_S$ is greater than zero, the algorithm proceeds to step 112B, as shown by line 115.

In step 112B of FIG. 4, the controller 70 starts the on-timer 20 (see FIG. 1) for a calibrated on-time. In one example, the calibrated on-time is approximately 30 seconds. When the on-timer 20 indicates that the elapsed time is equal to or greater than the calibrated on-time, the controller 70 proceeds to step 112C in which the controller 70 turns off the pressure command (i.e. commands a zero stage pressure) and starts the off-timer 22 (see FIG. 1) for a calibrated off-time. In one example, the calibrated on-time is approximately 30 seconds.

When the off-timer 22 indicates that the elapsed time is equal to or greater than the calibrated off-time, as indicated by line 117, the controller 70 proceeds back to step 110. As noted above, in step 110, the controller 70 is configured to cancel the pressure command if one or more exit conditions are met and exit the algorithm 100. This sequential turning on and off of the pressure command for respective calibrated on and off-times is repeated until one of the exit conditions is met, per step 110.

FIG. 5A illustrates a first example of a pressure command 400 prior to a downshift event 402. FIG. 5B illustrates a second example of a pressure command 410 prior to a downshift event 412. The pressure commands 400 and 410 are synchronized for time on the horizontal axis at t1, t2, t3, t4 and t5 and are intended to be non-limiting. FIGS. 5A-B are not drawn to scale. Time t5 represents the start of the downshift events 402, 410. Conventionally, the filling process would commence after time t5. However, the algorithm 100 of FIG. 4 allows the on-coming clutch 30A to be partially pressurized or staged prior to the start of the downshift events 402, 412 at t5.

In the first example shown in FIG. 5A, the pressure command 400 includes a first portion 404 that is constant at a first value $C_1$ for a first time period (t1 to t2) and a second portion 406 that is constant at a second value $C_2$ for a second time period (t2 to t3). The first value $C_1$ is greater than the return spring pressure $P_R$ and the second value $C_2$ is below the return spring pressure $P_R$. In one example, $P_R$ is 150 kPa, $C_1$ is 170 kPa and $C_2$ is 120 kPa. The actual pressure trace 408 corresponding to the pressure command 400 is shown in dashed lines. The actual pressure trace 408 is approximately equal to the pressure command 400 at time t3.

In the second example shown in FIG. 5B, the pressure command 410 includes a first portion 414 that linearly rises or ramps up to a third value $C_3$ for the first time period (t1 to t2) and a second portion 416 that remains constant at the third value $C_3$ for the second time period (t2 to t3) until the beginning of the downshift event at t5. The third value $C_3$ is less than the return spring pressure PR. The third value $C_3$ may be the same as the second value $C_2$. In one example, $P_R$ is 150 kPa and $C_3$ is 130 kPa. In another example, $P_R$ is 150 kPa and $C_3$ is 120 kPa. The actual pressure trace 418 corresponding to the pressure command 410 is shown in dashed lines. The actual pressure trace 418 is approximately equal to the pressure command 410 at time t4.

Each of the traces or graphs shown in FIGS. 3, 5A and 5B may be adjusted or calibrated with adjustment offset values. The adjustment offset values may be stored in one or more look-up tables, databases, data repositories, or other types of data stores.

The controller 70 of FIG. 1 may include a computing device that employs an operating system or processor for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A transmission comprising:
a plurality of oncoming clutches, each of the plurality of oncoming clutches being hydraulically-actuated;
a controller operatively connected to the plurality of oncoming clutches;
an algorithm stored on and executable by the controller to cause the controller to:
determine if at least one predefined coast condition is met;
identify the plurality of oncoming clutches configured to be engageable during a downshift event from an initial gear ratio to respective other gear ratios, the initial gear ratio being greater than each of the respective other gear ratios; and
at least partially prefill a first one of the plurality of oncoming clutches by generating a first pressure command to at least partially pressurize the first one of the plurality of oncoming clutches to a first staging pressure ($P_{S1}$) if the at least one predefined coast condition is met prior to the downshift event; and
wherein the first staging pressure ($PS_1$) is defined as a first return spring pressure ($P_{R1}$) minus a first variable correction factor ($CF_1$).

2. The transmission of claim 1, wherein:
the controller is programmed with a first look-up table defining the first variable correction factor ($CF_1$) for the first one of the plurality of oncoming clutches; and
the first one of the plurality of oncoming clutches includes a first biasing member characterized by the first return spring pressure ($P_{R1}$) such that the first one of the plurality of oncoming clutches is fully engaged when the first return spring pressure ($P_{R1}$) is applied.

3. The transmission of claim 1, wherein:
the transmission defines first, second, third, fourth, fifth and sixth gear ratios;
the initial gear ratio corresponds to the sixth gear ratio and the respective other gear ratios include the fifth, fourth and third gear ratios.

4. The transmission of claim 1, wherein the algorithm stored on and executable by the controller further causes the controller to:
cancel the pressure command if the at least one predefined coast condition is no longer met or the downshift event occurs.

5. The transmission of claim 1, wherein the pressure command is sequentially turned on and off for a calibrated on-time and a calibrated off-time, respectively.

6. The transmission of claim 5, wherein the calibrated on-time and a calibrated off-time are each 30 seconds.

7. The transmission of claim 1, wherein the algorithm stored on and executable by the controller further causes the controller to:
generate a second pressure command to at least partially pressurize a second one of the plurality of oncoming clutches to a second staging pressure ($P_{S2}$) if the at least one predefined coast condition is met prior to the downshift event.

8. The transmission of claim 1, wherein the algorithm stored on and executable by the controller further causes the controller to:
generate respective pressure commands to at least partially pressurize each of the plurality of oncoming clutches to respective staging pressures ($P_S$) if the at least one predefined coast condition is met, the respective staging pressures ($P_S$) being defined as a respective return spring pressures ($P_R$) minus a respective variable correction factors (CF).

9. The transmission of claim 1, wherein:
the controller is programmed with respective look-up tables that determine a respective variable correction factor (CF) for each of the plurality of oncoming clutches; and
each of the plurality of oncoming clutches includes a respective biasing member characterized by the respective return spring pressure ($P_R$) such that the plurality of oncoming clutches are fully engaged when the respective return spring pressure ($P_R$) is applied.

10. A vehicle comprising:
a transmission having a plurality of oncoming clutches, each of the plurality of oncoming clutches being hydraulically-actuated;
a controller operatively connected to the plurality of oncoming clutches;
an algorithm stored on and executable by the controller to cause the controller to:
   determine if at least one predefined coast condition is met;
   identify the plurality of oncoming clutches configured to be engageable during a downshift event from an initial gear ratio to respective other gear ratios, the initial gear ratio being greater than each of the respective other gear ratios; and
   at least partially prefill a first one of the plurality of oncoming clutches by generating a first pressure command to at least partially pressurize the first one of the plurality of oncoming clutches to a first staging pressure ($P_{S1}$) if the at least one predefined coast condition is met prior to the downshift event; and
wherein the first staging pressure ($PS_1$) is defined as a first return spring pressure ($P_{R1}$) minus a first variable correction factor ($CF_1$).

11. The vehicle of claim 10, wherein:
the controller is programmed with a first look-up table defining the first variable correction factor ($CF_1$) for the first one of the plurality of oncoming clutches; and
the first one of the plurality of oncoming clutches includes a first biasing member characterized by the first return spring pressure ($P_{R1}$) such that the first one of the plurality of oncoming clutches is fully engaged when the first return spring pressure ($P_{R1}$) is applied.

12. The vehicle of claim 10, further comprising:
a torque converter operatively connected to the transmission and having a turbine defining a turbine speed; and
wherein the first look-up table is based at least partially on the turbine speed and a transmission fluid temperature.

13. The vehicle of claim 10, further comprising:
an engine operatively connected to the transmission and producing an engine torque; and
wherein the at least one predefined coast condition is met when the engine torque is below a predefined maximum engine torque.

14. The vehicle of claim 13, wherein the predefined maximum engine torque is approximately 15 Nm.

15. The vehicle of claim 10, further comprising:
an accelerator pedal operatively connected to the transmission and defining a pedal position;
wherein the at least one predefined coast condition is met when the pedal position of the accelerator pedal is less than a predefined calibrated pedal position.

16. The vehicle of claim 10, wherein the algorithm stored on and executable by the controller further causes the controller to:
cancel the pressure command if the at least one predefined coast condition is no longer met or the downshift event occurs.

17. A method of controlling a transmission, the method comprising:
determining whether at least one predefined coast condition is met;
identifying a plurality of oncoming clutches in the transmission configured to be engageable during a downshift event from an initial gear ratio to respective other gear ratios, the initial gear ratio being greater than each of the respective other gear ratios;
wherein each of the plurality of oncoming clutches are hydraulically-actuated and include a respective biasing member characterized by a respective return spring pressure ($P_R$) such that the plurality of oncoming clutches are fully engaged when the respective return spring pressure ($P_R$) is applied;
determining a respective staging pressure ($P_S$) for the plurality of oncoming clutches, the staging pressure ($P_S$) being the respective return spring pressure ($P_{RS}$) minus a respective variable correction factor ($CF$);
generating a pressure command to at least partially pressurize at least one of the plurality of oncoming clutches to the respective staging pressure ($P_S$) if the at least one predefined coast condition is met prior to the downshift event.

18. The method of claim 17, further comprising:
canceling the pressure command if the at least one coast condition is no longer met or the downshift event occurs.

19. The method of claim 17, wherein determining the respective staging pressure ($P_S$) includes:
determining the respective variable correction factor based at least partially on respective look-up tables for the plurality of oncoming clutches.

20. The method of claim 17, further comprising:
sequentially maintaining and cancelling the pressure command for a calibrated on-time and a calibrated off-time, respectively.

* * * * *